United States Patent [19]

Largman et al.

[11] 3,882,076

[45] May 6, 1975

[54] METHOD FOR IMPROVING FLAME RETARDANCY OF POLYAMIDE COMPOSITIONS AND RESULTANT PRODUCT

[75] Inventors: Theodore Largman, Morris Twp.; Leon J. Schmehl, Lincoln Park, both of N.J.; Herman Stone, Andover, Mass.

[73] Assignee: Allied Chemical Corporation, New York, N.Y.

[22] Filed: Mar. 15, 1973

[21] Appl. No.: 341,632

[52] U.S. Cl. ........ 260/37 N; 260/45.7 P; 260/78 SC
[51] Int. Cl.............................................. C09k 3/28
[58] Field of Search ......... 260/37 N, 45.7 P, 78 SC; 117/138; 423/322

[56] References Cited
UNITED STATES PATENTS 3,576,769  4/1971  Hirsch et al. ........................ 260/2.5
3,660,344  5/1972  Michael et al. ........................ 260/37
3,778,407  12/1973  Hild et al. .............................. 260/37

OTHER PUBLICATIONS

Van Wazer, "Phosphorus and Its Compounds," Vol. I, 1958, pages 112, 113, 118–121 and 123.

Krebs, Chem. Abs., Vol. 52, 1958, 9538 B.

*Primary Examiner*—Melvyn I. Marquis
*Assistant Examiner*—R. A. White
*Attorney, Agent, or Firm*—Arthur J. Plantamura; Roger H. Criss

[57] ABSTRACT

Polyamide compositions containing an effective amount of an elemental phosphorus flame retardant additive, preferably red phosphorus, are rendered more flame retardant by heating the composition in the presence of oxygen at a temperature of at least about 100°C.

16 Claims, No Drawings

3,882,076

1

METHOD FOR IMPROVING FLAME RETARDANCY OF POLYAMIDE COMPOSITIONS AND RESULTANT PRODUCT

BACKGROUND OF THE INVENTION

1. Field of the Invention

This invention relates to flame retardant polyamide compositions.

2. Discussion of the Prior Art

Recent increasing public awareness and demand for safety of commercial products has led to new legislation requiring many types of plastic products, such as synthetic fibers, building materials and molded articles, to be flame retardant. This in turn has given new impetus to researchers to discover improved flame retardant additives for polymers which will meet these higher standards.

Numerous flame retardant additives for various polymers are known. It has recently been discovered that red phosphorus is an effective flame retardant additive for nylon 6. Although red phosphorus imparts sufficient flame retardancy to nylon 6 to enable the polymer to be utilized in a variety of applications, in many fields of technology such as the airline and aerospace industries, stricter standards of flame retardancy are required. Prior to this invention, the flame retardancy imparted by red phosphorus to nylon 6 has been below that necessary to meet such more stringent standards.

SUMMARY OF THE INVENTION

It has been discovered that a polyamide composition which contains an effective amount of an elemental phosphorus flame retardant additive can be rendered more flame retardant by a process which comprises heating the polyamide composition in the presence of molecular oxygen at a temperature of at least about 100°C. for a period of time sufficient to increase the flame retardancy of the composition.

More particularly, in accordance with one embodiment of this invention, a composition comprising polyamide resin and about 0.1 to about 15 percent by weight elemental phosphorus is rendered significantly more flame retardant by heating the composition in the presence of molecular oxygen at at least about 100°C. for sufficient time to increase the flame retardancy of the polyamide. In a preferred embodiment, the composition is heated for a time sufficient to increase its flame retardance, as measured by the standard Limiting Oxygen Index, by at least about 10 percent and more, preferably at least about 25 percent. Such heat aged compositions are also rated self-extinguishing under the standard vertical burn test of Underwriter's Laboratory (U.L.) Bulletin 94. This discovery is surprising since it has been found that similar heat treatments of polyamide compositions containing other conventional flame retardant additives or other polymer compositions containing elemental phosphorus as a flame retardant additive either decrease the initial flame retardancy of such compositions or do not provide the flame retardancy increase as well as the self-extinguishing properties of a polyamide-elemental phosphorus composition.

DESCRIPTION OF THE PREFERRED EMBODIMENT

In accordance with a preferred embodiment of this invention, polyamide compositions containing an effective amount of an elemental phosphorus flame retardant additive are rendered more flame retardant by subjecting the composition to a heat treatment in the presence of molecular oxygen at a temperature of at least about 100°C. and preferably not more than about 200°C. A preferred temperature range is about 140°C. to about 180°C., with a more preferred range being about 150°C. to about 170°C. As stated above, the duration of the heat treatment is sufficient to increase the flame retardance of the composition. The heat treatment time depends upon a number of factors including the nature of the polyamide resin, the type of oxygen atmosphere, the pressure of the oxygen atmosphere, etc. For example, in the presence of air at atmospheric pressure, the polyamide compositions are rendered more flame retardant by heating the same to a temperature of at least about 100°C. for at least about 5 days, preferably at least about 10 days and more preferably between about 10 and about 20 days. When the heat treatment is conducted in a 100 percent oxygen atmosphere at atmospheric pressure, the compositions need be heated in the above temperature ranges for about 2 days to impart approximately the same amount of increased flame retardance to the compositions as is achieved by utilizing an air atmosphere and heating for about 5 or 10 days. Further reduction in heating times are possible by employing superatmospheric pressures.

It has been found that the heat treatment process of this invention can be employed to dramatically increase the flame retardancy of the polyamide composition as measured by the standard Limiting Oxygen Index Test (L.O.I.). For example, the L.O.I. of a nylon 6 (polycaprolactam) composition containing 7 percent red phosphorus as a flame retardant additive can be increased from about 28 to about 60 to 66 by heat aging the composition in air at atmospheric pressure and at a temperature of 170°C. for 20 days.

As indicated above, compositions which are rendered more flame retardant comprise polyamide resins. The term "polyamide" as employed herein includes polycarbonamides having recurring —CONH— groups along the polymer chain. Examples of polyamide resins employable herein are polypyrrolidone, polycaprolactam, polycapryllactam, poly(9-aminopelargonic acid), poly(11-aminoundecanoic acid), poly(12-aminolauric acid), polyhexamethyleneadipamide, polyhexamethylenesebacamide, and the like and copolymers thereof. A particularly preferred polyamide is polycaprolactam (nylon 6). Such polymers may be produced by any conventional polymerization process.

As is known to those skilled in the art, such polyamides can contain conventional additives such as heat and light stabilizers, mold lubricants, terminating agents, nucleating agents, delusterants, pigments, fillers (e.g., glass fibers, glass mats, etc.) and the like in effective amounts. For some applications it is preferred to include about 1 to about 40 percent by weight glass fibers based on the polyamide.

The polyamide compositions of this invention include an effective amount of elemental phosphorus. The phosphorus is preferably in the form of red phosphorus although black phosphorus may also be employed. The elemental phosphorus is preferably present in the polyamide composition in an amount of about 0.1 to about 15 percent by weight, based on the polyamide. In a more preferred embodiment, red phosphorus is employed as the flame retardant in an amount of about 2% to about 7% by weight based upon the polyamide.

The phosphorus may be incorporated into the polyamide composition by any suitable manner, such as dry blending, coating, etc. The phosphorus need not be homogeneously blended into the composition. It is believed that the heat aging effect is a surface phenomenon and hence it may be desirable to merely coat a polyamide composition, in the form of an intermediate shape (e.g., pellets) or a final shaped article, with the phosphorus in a form suitable for coating. If coating is employed, it is often desirable to anneal the composition to diffuse the phosphorus into the polyamide.

A particularly preferred composition useful in the process of this invention comprises polycaprolactam and red phosphorus. It is preferred to heat age such composition in the presence of air at atmospheric pressures at a temperature of about 100°C. to about 200°C. for a period of about 10 to about 20 days. Heat treatments at temperatures below about 100°C. and at durations below about 10 days are generally insufficient to impart the enhanced flame retardant effect to the preferred compositions when heating is accomplished in air at atmospheric pressure. Temperatures above about 200°C. should generally be avoided since degradation of the polymer may occur, including unacceptable decreases in desired physical properties of the composition such as ultimate tensile strength and ultimate elongation. At heating times greater than about 20 days no further substantial enhancement of flame retardancy is noted and the physical properties of the polymer generally are more adversely affected.

Any suitable means can be employed for the requisite heat treatment, such as a hot air oven, infrared lamps, etc. As such means are well known, they are not specifically described herein.

As set forth above, it is preferred to heat age the polyamide-phosphorus composition for a time sufficient to impart the desired increase in flame retardancy to the composition. It is generally preferred to heat age the composition for a time sufficient to impart at least a 10 percent, and more preferably at least a 25 percent increase in flame retardancy as measured by the L.O.I. test, while at the same time providing a composition which is self-extinguishing as measured by the vertical burn test of U.L. Bulletin 94. The L.O.I. test is described in ASTM Test D-2863 and is a measurement of the minimum oxygen concentration, expressed as a volume percent, in a mixture of oxygen and nitrogen that will just support combustion of a compression molded bar when ignited from above.

It has been recognized that heat treatment of plastics, including polyamide compositions, often has an adverse effect on the physical properties of the plastic. Accordingly, the degree of increased flame retardancy desired to be imparted to the polyamide composition should be weighed against any substantial decrease in other desirable properties. In many instances heat aging conditions may be selected which impart an increase in the flame retardancy without decreasing desirable physical properties of the composition, such as ultimate tensile strength and ultimate elongation, by more than about 50 percent of their non-heat aged levels.

Although the Limiting Oxygen Index Test is generally a good indication of the flame retardance of the sample tested, at times the L.O.I. of a sample may indicate a flame retardant material whereas the material is not rated as self-extinguishing by other industry tests. The reasons for such artificially high L.O.I. levels are not known, although they may be due to polymer chain scission or other effects. It is therefore often desirable to also measure the flammability characteristics of the composition in accordance with the vertical burn test described in U.L. Bulletin 94 in which samples are ignited from below. In such test, specimen test rods are held in a vertical position while a ¾ inch flame from a Bunsen burner (technical grade methane gas) is held for 10 seconds under the lower end of the specimen. The sample is supported by a clamp from its upper ¼ inch and is spaced at a distance ⅜ inch above the top of the burner tube and 12 inches above a horizontal layer of surgical cotton. With the flame withdrawn, duration of flaming of the specimen is noted. When flaming ceases, the test flame is again placed under the specimen. After 10 seconds, the test flame is again withdrawn and the duration of flaming and glowing is noted. It is also noted whether the specimens drip flaming particles which ignite the cotton. The test is repeated except that dry surgical cotton is applied to the glow after 10 seconds from the second removal of the test flame. It is noted whether the cotton ignites.

Materials are classified self-extinguishing (SE-II) if (1) no specimens burn with flaming combustion for more than 30 seconds after each application of the flame, (2) the total flaming combustion time does not exceed 250 seconds for ten flame applications for each set of 5 specimens, (3) no specimens burn up to the holding clamp, (4) specimens that drip flaming particles burn only briefly, some of which ignite the cotton, (5) no specimens continue to burn to a 4 inch reference mark when subjected to a horizontal burning test, (6) no specimens glow beyond 60 seconds after the second removal of the flame and (7) no specimens glow beyond 30 seconds and ignite the cotton after second removal of the flame. Materials which fail to meet such standards are rated "N.R."

More stringent standards than those set forth above must be met for a material to be classified "SE-I" and still more stringent standards must be met for a "SE-O" classification, the highest rating under the test. To be classified SE-O, a material must meet the following requirements: (1) no specimens burn with flaming combustion for more than 10 seconds after each application of the flame, (2) the total flaming combustion time does not exceed 50 seconds for ten flame applications for each set of 5 specimens, (3) no specimens burn up to the holding clamp, (4) no specimens glow beyond 30 seconds after the second removal of the flame and (5) no specimens glow beyond 10 seconds and ignite the cotton after the second removal of the flame.

It has been found that polyamide-phosphorus compositions when heat treated in accordance with this invention evidence an increase in the initial L.O.I. and also are rated self-extinguishing (at least SE-II) under the vertical burn test of U.L. Bulletin 94.

As indicated previously, molecular oxygen must be present during the heat treatment in order to impart the increased flame retardancy to the polyamide compositions. For this reason, the heating is conducted in an air or oxygen-rich atmosphere. Air pressures greater than atmospheric may be employed to shorten the heating time required to impart a particular increase in flame retardancy to the composition.

The polyamide-phosphorus compositions which are treated in accordance with the process of this invention may be in the form of an intermediate shape (e.g., molding pellets), which can be used to prepare shaped products, or a final shape (e.g., a molded or extruded product).

By way of illustrating the present invention, the following examples are given. All percentages are by weight unless otherwise specified.

EXAMPLE 1

Polyamide compositions were prepared by dry blending a polyamide resin with various flame retardant additives and 30 percent glass fiber. Sample bars measuring ½ inch × ⅛ inch × 5 inches were compression molded from the compositions. The sample bars were tested for flammability in accordance with ASTM Test D-2863 and the vertical burn test of U.L. Bulletin 94. Similarly formed sample bars were heat aged at 170°C. for 20 days in a hot air oven at atmospheric pressure and the flammability tests were repeated. The results appear in Table I.

EXAMPLE 3

Polycaprolactam samples containing 7 percent red phosphorus and 30 percent glass fiber were heat aged under accelerated conditions of elevated pressure and in a 100 percent oxygen atmosphere. The results are reported in Table III.

TABLE III

Accelerated Aging of Glass Filled
Nylon Containing 7% Red Phosphorus

| Atmosphere | Pressure (psig) | Temperature °C. | Time (hrs) | LOI |
|---|---|---|---|---|
| $O_2$ | 1000 | 75–95 | 6.5 | <28 |
| *$O_2$ | 1000 | 170–195 | 8 | ~29 |
| $O_2$ | 1000 | 170–195 | 8 | 28–29 |
| $O_2$ | 1000 | 150 | 26 | 33 |
| $O_2$ | 1000 | 125–32 | 24 | <28 |
| **$O_2$ | 1000 | 170 | — | — |
| $O_2$ | 1000 | 150 | 49 | 67–71 |
| $O_2$ | 2000 | 150 | 24 | 37–44 |
| $O_2$ | 1000 | 140 | 50 | 54–62 |
| Air | 2000 | 150 | 48 | 33–36 |
| Air | 2000 | 170 | 48 | 52–55 |

*Unfilled nylon
**Exotherm, probably ignition, sample destroyed

TABLE I

Heat Aging of Polyamides in Air at 170°C.

| Sample | Polyamide Type | Additive | Percent | L.O.I. 0 days | L.O.I. 20 days | U.L. 94 0 days | U.L. 94 20 days |
|---|---|---|---|---|---|---|---|
| 1 | polycaprolactam | none | — | 26 | 23–24.5 | N.R. | N.R. |
| 2 | polycaprolactam | red phosphorus | 7 | 28 | 60–66 | SE-O | SE-O |
| 3 | polyhexamethylene adipamide | none | — | 23.5 | 32–35 | N.R. | N.R. |
| 4 | polyhexamethylene adipamide | red phosphorus | 7 | 28 | 60.5 | SE-O | SE-O |
| 5 | nylon 12 (unfilled) | red phosphorus hexabromobenzene | 2<br>3 | 29 | 35 | * | * |
| 6 | polycaprolactam | melamine metaphosphate | 5 | 25.5 | 29 | * | * |
| 7 | do. | $WO_3$ | 5 | 26.5 | 22–23 | * | * |
| 8 | do. | Dechlorane plus** | 10 | 24.2 | 26.5 | * | * |
| 9 | do. | Dechlorane plus** $Sb_2O_3$ | 6<br>3 | 28 | 28 | * | * |
| 10 | do. | hexabromobenzene | 4 | 24 | 23–25.5 | * | * |
| 11 | do. | triacetylmelamine | 6 | 23.2 | 27–28 | * | * |

* - not measured
** - Dechlorane plus is a polyhalogenated cyclopentadiene derivative [available from Hooker Chemical Corp.]

EXAMPLE 2

Comparative samples based upon polymers other than polyamides were prepared following the procedure of Example 1. The L.O.I. for each sample was measured before and after heat aging. The results appear in Table II.

TABLE II

Heat Aging of Various Polymer Compositions Including Red Phosphorus in Air at 170°C.

| Sample | Polymer | Additive | % Additive | L.O.I. 0 days | L.O.I. 20 days |
|---|---|---|---|---|---|
| 1 | Polyethylene terephthalate | Red Phosphorus | 4 | 34.5 | 31–32.5 |
| 2 | Polyethylene terephthalate | Red Phosphorus ZnO | 2<br>2 | 29 | 28 |
| 3 | Polyethylene terephthalate | Red Phosphorus | 5 | 35 | 33 |
| 4 | Polypropylene* | Red phosphorus | 7 | 24 | 25.5–27.5 |

*15% glass fiber filled

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:

1. A method of increasing the flame retardancy of a polyamide composition comprising a polycarbonamide having recurring —CONH— groups along the polymer chain and an effective amount of red or black phosphorus as a flame retardant additive which comprises heating said polyamide composition in the presence of molecular oxygen to a temperature of at least about 100°C for at least about 5 days.

2. The method of claim 1 wherein said polyamide composition is heated in the presence of air at atmospheric pressure at a temperature in the range of about 100°C. to about 200°C.

3. The method of claim 2 wherein said polyamide composition is heated at a temperature in the range of about 140°C. to about 180°C. for at least about 10 days.

4. The method of claim 3 wherein said polyamide composition comprises polycaprolactam and said elemental phosphorus is red phosphorus.

5. The method of claim 4 wherein said composition is heated at a temperature in the range of about 150°C. to about 170°C. for about 10 to about 20 days.

6. The method of claim 4 wherein said red phosphorus is present in an amount of about 0.1 to about 15 percent by weight based on the polycaprolactam.

7. The method of claim 6 wherein said red phosphorus is present in an amount of about 2 to about 7 percent by weight based on the polycaprolactam.

8. The method of claim 6 wherein said composition further contains about 1 to about 40 percent by weight glass fibers based on the polycaprolactam.

9. A method of increasing the flame retardancy of a polyamide composition comprising a polycarbonamide having recurring —CONH— groups along the polymer chain and an effective amount of red or black phosphorus as a flame retardant additive which comprises heating said polyamide composition in the presence of molecular oxygen to a temperature of at least about 100°C. for a time sufficient to increase its Limiting Oxygen Index as measured by ASTM Test D-2863 by at least about 10 percent, the resultant heat aged composition being rated self-extinguishing as determined by the vertical burn test of U.L. Bulletin 94.

10. The method of claim 1 wherein said composition is heated for a time sufficient to increase its Limiting Oxygen Index as measured by ASTM Test D-2863 by at least about 25 percent, the resultant heat aged composition also being rated self-extinguishing as determined by the vertical burn test of U.L. Bulletin 94.

11. The method of claim 1 wherein said polyamide composition comprises polycaprolactam and said elemental phosphorus is red phosphorus.

12. The method of claim 11 wherein said red phosphorus is present in an amount between about 0.1 percent and about 15 percent by weight based on the polycaprolactam.

13. A product produced by the method of claim 1.
14. A product produced by the method of claim 8.
15. A product produced by the method of claim 1.
16. A product produced by the method of claim 12.

* * * * *